United States Patent [19]
Falcon

[11] 3,952,965
[45] Apr. 27, 1976

[54] HAND LINE REEL
[76] Inventor: Pedro F. Falcon, 45 W. 46th Ave., Miami, Fla. 33127
[22] Filed: Dec. 11, 1974
[21] Appl. No.: 531,740

Related U.S. Application Data
[63] Substitute for Ser. No. 152,214, June 11, 1971, abandoned.

[52] U.S. Cl. .................................. 242/96; 242/99
[51] Int. Cl.² .................. B65H 75/40; B65H 17/44
[58] Field of Search .................... 242/84.2 J, 96–99, 242/137, 137.1, 138, 141, 146

[56] References Cited
UNITED STATES PATENTS

| 2,483,696 | 10/1949 | Giera | 242/96 |
| 2,574,216 | 11/1951 | Lindgren | 242/99 |
| 2,706,096 | 4/1955 | Rufle | 242/84.2 J |
| 2,923,490 | 2/1960 | Smith | 242/96 |

FOREIGN PATENTS OR APPLICATIONS

| 80,928 | 1/1952 | Norway | 242/84.2 J |
| 670,937 | 4/1935 | Germany | 242/137.1 |

Primary Examiner—Christian Leonard D.

[57] ABSTRACT

A reel comprised of a round cylindrical housing having one integral end wall closure providing a hand grip grip means, and a spool rotatably journaled within the cylindrical housing chamber. The spool includes a rewind handle, extending outwardly of the open mouth of the cylindrical chamber whereby said spool may be rotated in either direction. The fishing line which is normally stored on the spool is manually cast in a conventional manner causing the line to peel off of the spool through the open mouth until it settles in the water. A pair of generally diametrically opposed rewind slots are provided through the cylindrical housing, each being provided with an access slot, opening from the open mouth to the rewind slot, through which the line is passed into the rewind slot after each cast, the pair of slots providing for both right-hand and left-hand use. A snap on the closure cap is included to close the open mouth when the reel is not in use.

7 Claims, 3 Drawing Figures

U.S. Patent  April 27, 1976  3,952,965
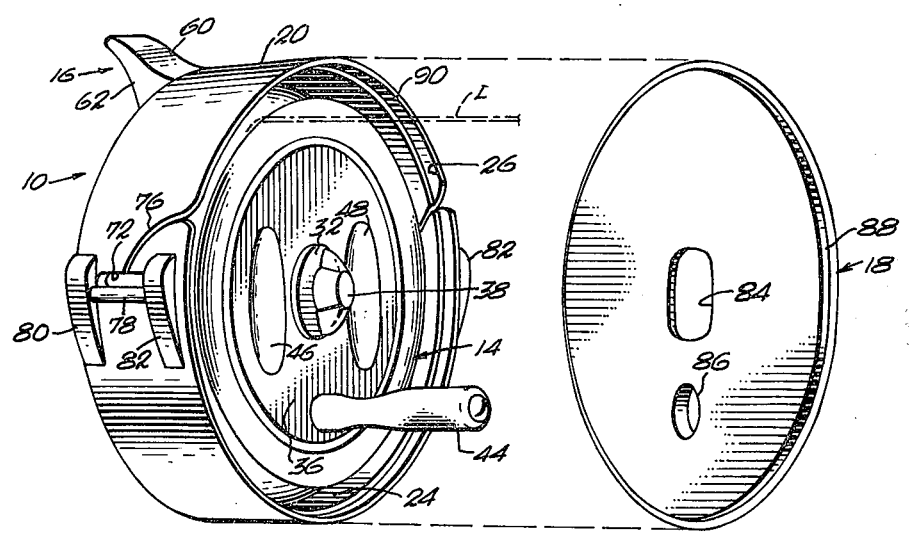
Fig. 1
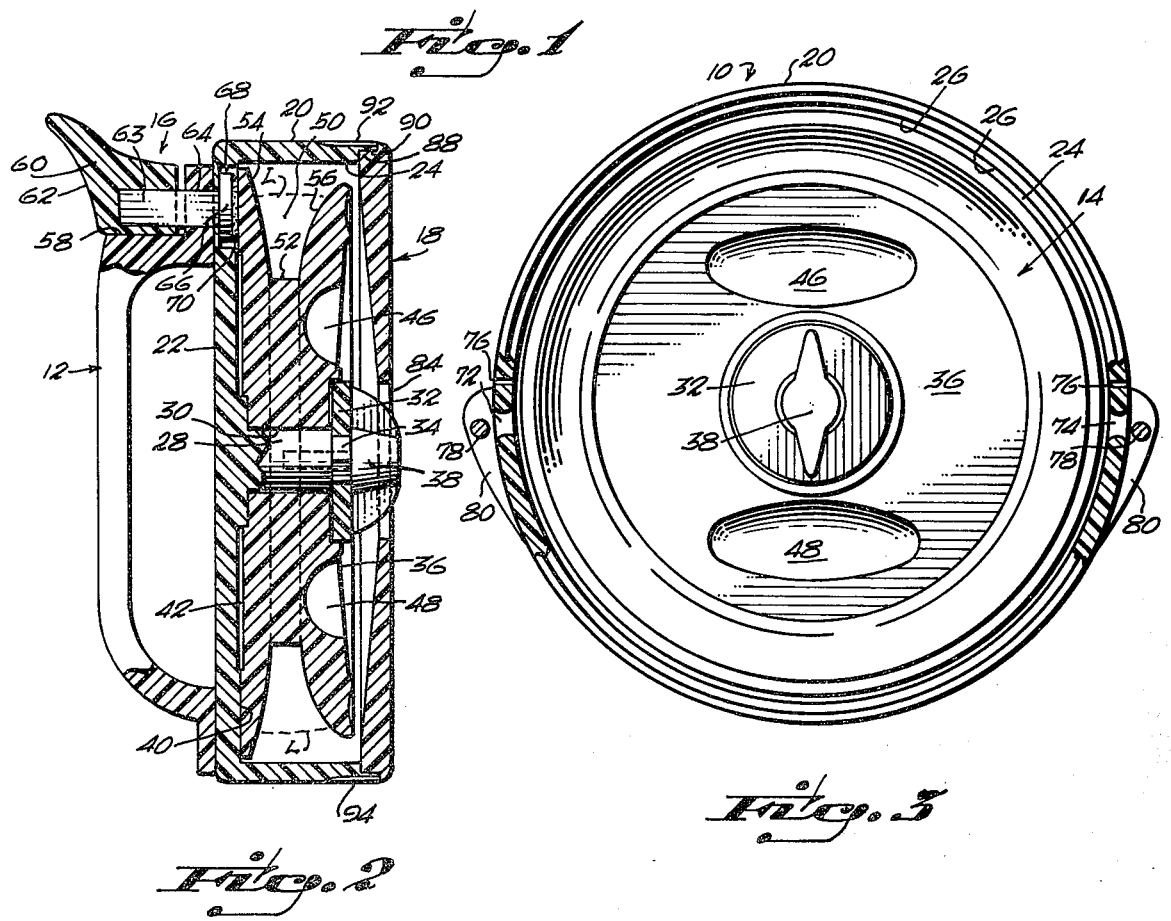
Fig. 2
Fig. 3
INVENTOR
PEDRO F. FALCON
BY John Cyril Malloy
ATTORNEY

HAND LINE REEL

STATE OF THE PRIOR ART

Most hand lines when used for fishing are simply wound around an elongated object such as a stick and before it can be cast, a suitable length of line is unwound from the object and left lying on the ground or pavement in loose swirls. The user then grasps the line somewhat rearwardly of the sinkers affixed thereto and swings the end portion of the line including the hook and sinkers until sufficient inertia is attained for the weight of the sinkers to cause the loose swirls to be picked up and played outwardly into the water. This procedure often results in tangles which are drawn tight by the inertia forces. Each time the line is retrieved, it is generally left lying in loose swirls in the same manner.

U.S. Pat. No. 3,174,703 to S. Falkum illustrates a Line Storing Reel which is used for hand lines and provides a spool comprised of a generally cylindrical or ring-like band having flared end portions and a handle extending diametrically across one end thereof.

When the line is cast in the conventional manner as described above, it peels from the spool until the sinker settles in the water. However, the spool is stationary relative to the handle and no rewind means is provided and the line must therefore be manually rewound on the spool each time it is retrieved or left lying in loose swirls.

Because of the extremely slow nature of a manual rewind, the S. Falkum device provides very little advantage over simply storing the hand line on a stick or any other convenient object. During the course of a day of fishing, the line is cast and retrieved many times and if the fisherman manually rewinds his line on any type of object such as a spool, stick, etc., each time it is retrieved, a considerable percentage of his fishing time is consumed in the rewind prosess. As a result the line is generally left lying in loose swirls in an attempt to get his line back into the water as soon as possible.

BACKGROUND OF THE PRESENT INVENTION

The present invention provides a very inexpensive reel for fishermen who use a hand line for fishing instead of a pole or rod.

A principal object of the present invention is to provide a hand line reel which may be molded of plastic and utilizes no expensive gears, bearings or the like.

Another principal object of this invention is to provide a reel which includes a line storage spool from which the line is automatically stripped each time the fisherman makes a cast.

Still another object of the instant invention is to provide a reel having a spool which is rotatable both clockwisely and counterclockwisely and line guide means whereby said reel is operable by either a right-handed or left-handed person for the purpose of fighting a fish or for retrieving the fishing line for restorage on the reel.

Yet another object of the invention is to provide a hand grip, extending outwardly from the reel housing, and a thumb operated brake to control the rotational movement of the reel by the application of friction forces while the fisherman is fighting a fish. Hand lines in common usage are generally very heavy such as 150 pound test. This is necessary because there is no way to apply drag to the line except by means of the fisherman's hands and, when a large fish is hooked, this can result in rather severe burns. As a result the line must be tied off on something stationary or wrapped around the fisherman's hands in a manner to prevent the fish from running, this latter method can also result in injury.

The instant invention, therefore, provides a reel for relatively lightweight handlines whereby the same general, more sporting, method of fighting a large fish is provided as employed when using a conventional rod and reel, that is the method of "playing the fish" by letting it run until it is "tired out."

Another object of this invention is to provide a snap-on cover for the open mouth of the reel, when it is not in use, to provide a completely self-contained unit with the hook and sinker means attached to the end portion of the line being stored within the reel housing.

BRIEF DESCRIPTION OF THE DRAWINGS

FIG. 1 is a perspective view of the hand line reel of the present invention with the cover plate removed from the reel housing;

FIG. 2 is a vertical sectional view through the reel with the cover plate in place thereon; and FIG. 3 is a front face view of the reel, the cover plate being removed, with parts broken away to illustrate details of the retrieve slots.

DETAILED DESCRIPTION OF THE DRAWINGS

With reference to the drawings in which like reference numerals designate like or similar parts throughout the several views, and with particular reference to FIGS. 1 and 2, the reel includes a housing, generally indicated at 10, a hand grip 12, a spool 14, a spool brake 16 and a cover plate 18.

The housing 10 is comprised of an annular wall 20 having one end closure wall 22 to provide an internal cylindrical chamber 24 having an open mouth 26. A stub shaft 28 extends axially forwardly into the chamber 24 from the end wall 22 and the spool 14 includes an axially extending through hole 30 through which the stub shaft 28 extends to provide for rotational movement of the spool within the cylindrical chamber 24.

A washer 32 is stationarily held on a squared forward portion 34 of the stub shaft 28 against the front face 36 of the spool 14 and means such as the wing nut 38 is provided to hold the spool 14 on the stub shaft 28 in a manner so as to provide for rotational movement thereof between the washer 32 and the inside face 40 of the closure wall 22. An annular relieved portion 42 is provided to reduce the friction forces between the spool 14 and the face 40.

A handle 44 is fixed to the face 36 of the spool 14 and extends outwardly through the mouth 26. A pair of sinker storage cavities 46 and 48 are also provided in the spool face 36 for a purpose to be hereinafter described.

With reference to FIG. 2, the spool 14 includes a peripheral line storage groove 50 to receive a supply of line as indicated by the broken lines L. The groove 50 includes an annular floor 52 and outwardly diverging rear and forward walls 54 and 56, the forward wall 56 being more sharply rounded as illustrated to facilitate the discharge of the line from the groove 50 when the fisherman makes a cast.

The handle 12, as illustrated in FIG. 2, extends outwardly from the end wall closure 22 and may be molded integrally with the housing 10 or, as illustrated, may be molded separately and fixed thereto. A cutout 58 is provided in the upper end portion of the handle for the sliding reception of the operating means 60 of the brake 16. The operating means 60 comprises an appropriately configured push block having a rounded surface 62 for engagement by the thumb of the fisherman. A pin 63, preferably square, is fixed within the push block 60 and extends inwardly through a hole 64 and includes an enlarged head 66, lying within a recess 68 in the inner face 40 of the end wall 22.

As illustrated in FIG. 2, the head 66 is provided with a brake shoe 70, comprised of a material such as felt, which is positioned to engage the inner face of the spool 14 adjacent the outer periphery thereof. When inwardly directed forces are applied to the block 60, friction forces are applied against spool 14 by the brake shoe 70 to slow or stop rotational movement of said spool 14.

With reference to FIGS. 1 and 3, a pair of generally diametrically opposed transverse slots 72 and 74 are provided through the cylindrical housing wall 20 in alignment with the annular line storage groove 50 in the spool 14. Each transverse slot 72 and 74 is provided with an access slot 76 opening between the mouth 26 and said transverse slot. In this manner, the fishing line may be selectively passed from a position of extension through the mouth 26 through either access slot 76 into a slot 72 or 74 to position it for rewind on the spool when the fisherman is fighting a fish or desires to retrieve his line.

Each slot 72 and 74 is preferably provided with a line guide bar 78, outwardly thereof and in alignment therewith, which extends in a fixed relation between a pair of ears 80 and 82 formed integral with the housing 14.

FIGS. 1 and 2 illustrate the cover plate 18 which provides passage through apertures 84 and 86 for the wing nut 38 and the spool handle 44 and a reduced diameter peripheral shoulder 88 is frictionally engageable with the diameter provided at the mouth end 90.

When not in use, the loose end of the line carrying the fish hook is disposed within the housing and the sinker means on the line is disposed in one or both of the cavities 46 and 48 and the cover plate 18 is snapped onto the housing to form a completely self-contained unit.

When the reel is to be put into use, the cover plate is pulled off utilizing the diametrically opposed finger grip depressions 92 and 94, FIG. 2. Sufficient line is then removed from the spool 14 to permit the fisherman to swing the sinkers and make a cast in the conventional manner causing the fishing line to peel off of the spool 14 and to pass out through the mouth 26 between the peripheral edge of the spool and the wall 20 until the sinker comes to rest in the water.

The line L is then selectively passed through one of the access slots 76 into one of the transverse slots 72 or 74. If a large fish is hooked, the fisherman applies a desirable amount of drag on the line by applying the brake 16 until the fish is tired whereupon the fish is reeled in by turning the spool 14 by means of the handle 44. The line is retrieved at all times through one of the slots 72 or 74, with or without a fish. When another cast is to be made, the line L is passed out of the transverse slot 72 or 74 through the access slot 76 and the cast is made.

While a preferred form of the instant invention has been illustrated and described, it will be obvious to those skilled in the art that various changes and modifications can be made therein without departing from the true spirit of the invention as defined in the appended claims.

What is claimed is:
1. A hand line reel comprising:
A. a housing providing,
  1. an annular wall forming an inner annular cylindrical chamber, having an open mouth at one end,
  2. a closure wall across the end opposed to said open mouth,
  3. a fixed stub shaft extending axially into said annular chamber from said closure wall;
B. a spool rotatably mounted on said stub shaft within said annular chamber, said spool providing,
  1. an annular, peripheral line storage groove,
  2. an inner face,
  3. an outer face,
  4. a handle fixed relative to said outer face and extending outwardly through said mouth for manual actuation to impart rotational movement to said spool;
C. a fixed hand grip extending outwardly from said closure wall;
D. a manually operated brake means adjacent to said hand grip to apply selected amounts of friction forces to said inner face;
E. transverse slot means through said annular wall in general alignment with said line storage groove;
F. access slot means defined by space between said spool and annular wall opening between said transverse slot means and said open mouth.

2. A hand line reel as defined in claim 1 including a removable cover plate to close said open mouth, said cover plate being press-fitted within said annular wall.

3. A hand line reel as defined in claim 2 including cavity means in said outer face to store conventional lead fishing sinkers when said cover plate is fitted in place.

4. a hand line reel as defined in claim 3 in which said cavity means comprises two cavities in said outer face.

5. A hand line reel as defined in claim 1 in which said brake means comprises a push block exteriorly of said housing, a pin fixed to said push block extending inwardly through a hole in said closure wall, said pin providing an enlarged inner head portion having a brake shoe fixed to its inner surface which is positioned to frictionally engage said inner face when inwardly directed forces are applied to said push block.

6. A hand line reel as defined in claim 1 in which said transverse slot means comprises two generally diametrically opposed transverse slots and said access slot means comprises an access slot for each of said two opposed transverse slots.

7. A hand line reel as defined in claim 6 including a line guide bar outwardly of and in alignment with each of said transverse slots, each of said bars extending in a fixed relation between a pair of spaced apart ears formed integral with said annular wall.

* * * * *